Sept. 19, 1967 M. PANERAI ET AL 3,342,214
DEVICE FOR CUTTING OFF AND ADMIXING TWO FLUIDS
Filed Jan. 20, 1964 4 Sheets-Sheet 1
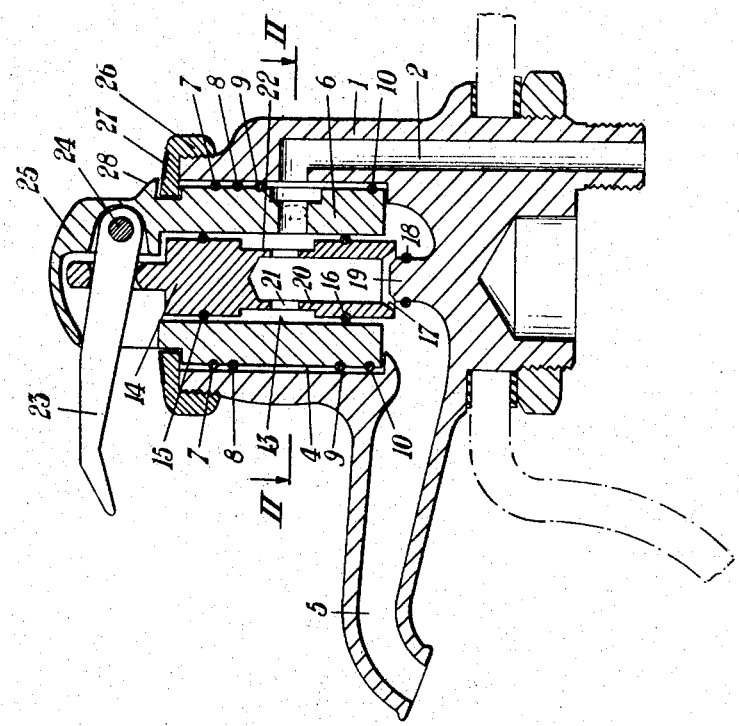
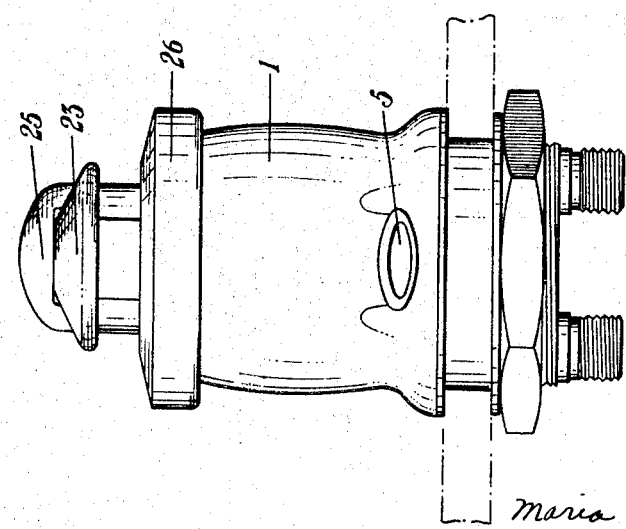
Maria Panerai and
Giuseppe Panerai
INVENTORS
BY Wenderoth, Lind
and Ponack,
attorneys Sept. 19, 1967 M. PANERAI ETAL 3,342,214
DEVICE FOR CUTTING OFF AND ADMIXING TWO FLUIDS
Filed Jan. 20, 1964 4 Sheets-Sheet 2
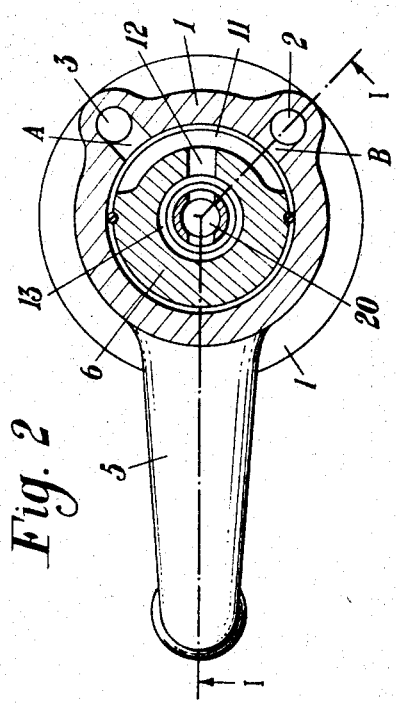
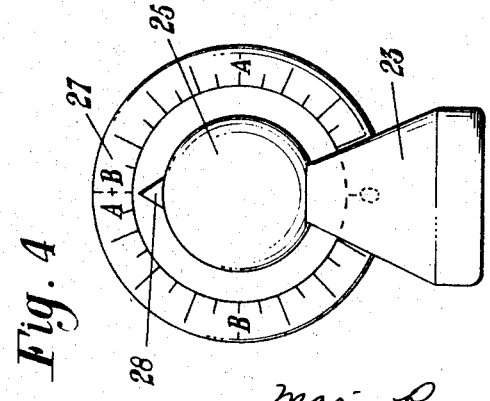
Maria Panerai and
Giuseppe Panerai
INVENTORS
BY Wenderoth, Lind
and Ponack,
attorneys

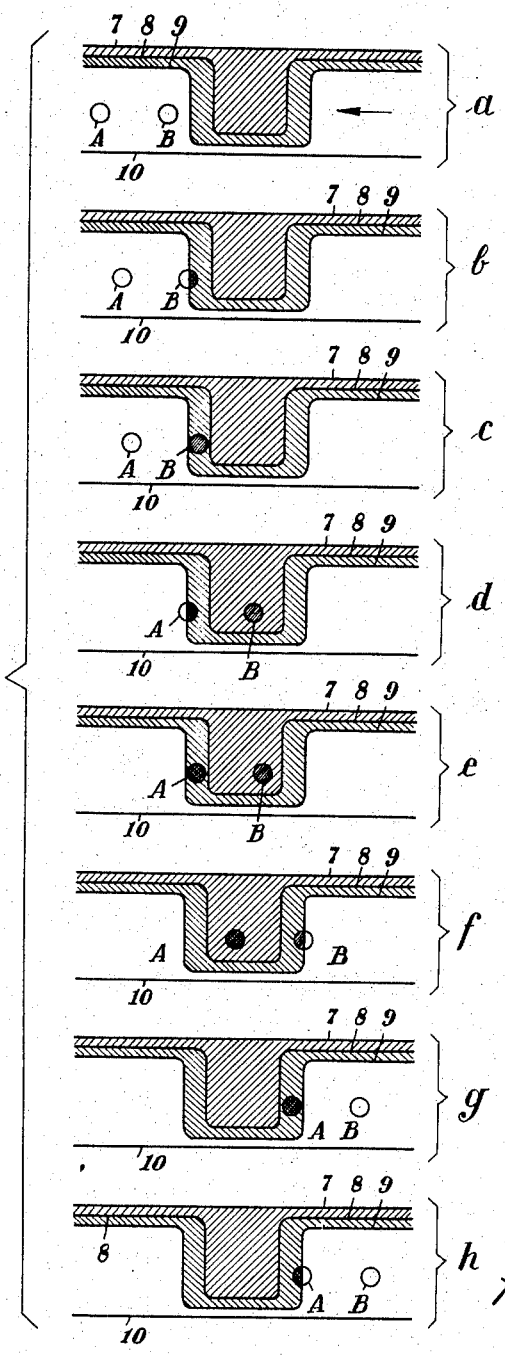

Sept. 19, 1967    M. PANERAI ET AL    3,342,214
DEVICE FOR CUTTING OFF AND ADMIXING TWO FLUIDS
Filed Jan. 20, 1964    4 Sheets-Sheet 4
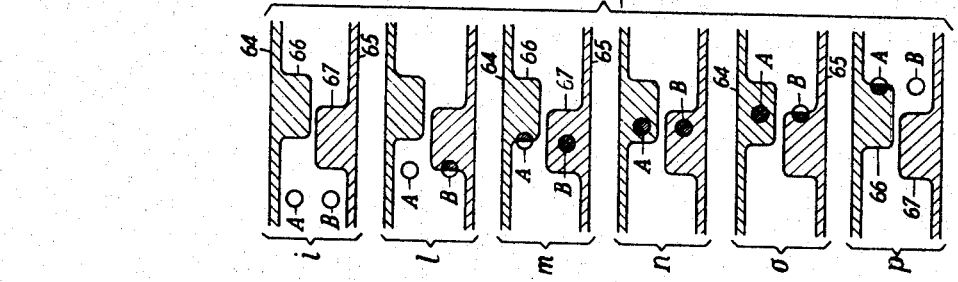
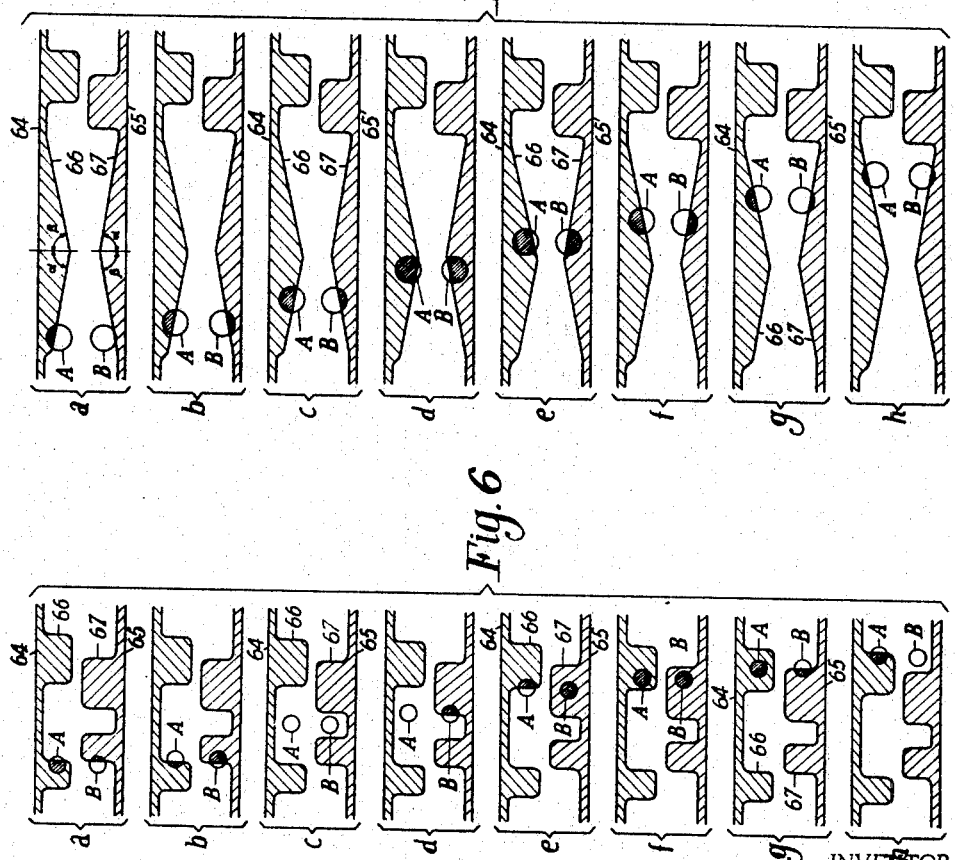
INVENTORS
Maria Panerai and
BY Giuseppe Panerai
Wenderoth, Lind
and Ponack, Attorneys

__UNITED STATES PATENT OFFICE__

3,342,214
Patented Sept. 19, 1967

3,342,214
DEVICE FOR CUTTING OFF AND ADMIXING
TWO FLUIDS
Maria Panerai and Giuseppe Panerai, both of
2 Piazza Galileo Ferraris, Florence, Italy
Filed Jan. 20, 1964, Ser. No. 338,879
Claims priority, application Italy, Apr. 8, 1963, 84,219;
Apr. 30, 1963, 85,158; Nov. 30, 1963, 93,493; Dec. 30,
1963, 9,577
12 Claims. (Cl. 137—636.4)

The present invention refers to a device for cutting off and admixing two fluids.

It is an object of the invention to provide a device of the above mentioned kind, designed to permit the selective or simultaneous delivery of two fluids according to a whole range of mixing ratios.

Another object of the invention is to provide a mixing device operated by a single control member, having a single outlet, and such that, in the shut-off position, the two fluids do not have any communication therebetween.

A further object of the invention is to provide a device capable of delivering two fluids admixed therebetween according to a selected ratio, variable at will, with a discharge flow which can vary from zero to a maximum value, while maintaining constant said admixing ratio.

Another object of the invention is to provide a mixing device capable, for any selected mixing ratio, of cutting off the discharge while maintaining independent and separated the two fluids, without changing the setting of the mixing control. In other words, after having selected a determined mixing ratio, one can act only on the control of the supply flow, so that, in shutting off said control, there occurs the important condition of the separation of the two fluids, which in the usual devices, occurred only when also the mixing control was under shut-off conditions of both the supplies of the fluids.

According to the invention, it is provided a two fluid cut off-mixing device comprising a hollow body carrying the supply orifices of the two fluids and an outlet, a rotary body provided with seals designed to effect the selection and/or cut-off of the two supply openings so as to obtain all the possible admixing conditions thereof, and a cut-off body, coaxially arranged inside said rotary body and integral in rotation with the latter, capable of axially sliding to control the discharge flow, from the tight shut-off to the maximum value while maintaining constant the selected mixing ratio.

In a further embodiment, the rotary body, besides rotating in the housing of the outer casing can slide axially in the same whereby besides effecting the desired admixing, it serves also the purpose of controlling the discharge flow and the tight shut-off.

The invention will be now described with reference to the attached drawings, which show by way of illustration, and not of limitation, some preferred embodiments of the invention.

In the drawings:

FIG. 1 is a sectional view along the line I—I of FIG. 2 of a cut off mixer according to the invention;

FIG. 2 is a sectional view along the plane II—II of FIG. 1;

FIG. 3 is a front view;

FIG. 4 is a plan view;

FIG. 5 shows a set of diagrams relating to the operating conditions of the devices according to the invention;

FIGURES 6, 7 and 8 show different approaches of the seals of the distributing member, developed on a plane.

With reference to FIGURES 1 to 4, the numeral 1 designates the outer casing or body of the device provided with supply passages 2 and 3 for the two fluids (for example hot water and cold water) leading to the two inlet openings A and B which open into the cylindrical housing 4 formed inside the body 1. The cylindrical housing 4 communicates, in turn, with an outlet designated by the numeral 5.

Inside the cylindrical housing 4 there is mounted a cylindrically shaped distributing body 6 which can rotate inside the housing 4.

The tightness between the cylindrical housing 4 and the outer surface of the distributing body 6, is assured by four O-ring seals, inserted within seats formed in the body 6, and designated with 7, 8, 9 and 10. Whereas the extreme seals 7 and 10 have a flat, annular outline, the intermediate seals have a "fret"-like outline (see also FIG. 5) that is they develop through a section along the periphery of the distributor 6, and through another section along a parallel sector connected to the former one by means of two vertical segments, that is lying along two generatrices of the cylindrical body 6, as will be better explained hereinafter.

The distributing body 6 carries a space 11, in the form of a segment of a circle, communicating with the radial passage 12 terminating in the inner cylindrical cavity 13 in which there can axially slide the shut-off 14 provided with sealing rings 15 and 16, and terminating with a tapered housing 17 designed to come in contact with the seal 18 carried by the projection 19, so as to shut-off the communication between the axial bore 20 of the cut-off and the outlet.

The axial bore 20, in turn, communicates with the radial passages formed in the groove 22.

The axial sliding of the cut-off 14 is controlled by a lever 23 pivoted at 24 on the extension 25 of the distributing body 6 projecting from the threaded ring 26. As shown in FIG. 1, by depressing or raising the lever 23, one has the sliding of the cut-off 14 and by rotating the lever in the horizontal plane one has the simultaneous rotation of the distributor 6 and the cut-off integral therewith in rotation.

The operation is as follows: by rotating the lever 23 in the horizontal plane, one has the selection of the two fluids or of only one of them or of the admixing ratio thereof or finally the complete shut-off, while by pushing the lever 23 downward, from the position of FIG. 1, one has the control of the discharge flow from the maximum value to the complete shut-off, yet maintaining constant the selection or the admixing ratio of the two fluids.

In FIG. 5 are shown in a diagrammatical form the more representative settings of the distributor 6 in relation to the supply orifices of the two fluids.

In the different position of FIG. 5, there is shown the outline of the seals 7, 8, 9 and 10 carried by the distributor 6 developed on a plane. As shown in said figure, the intermediate seals 8 and 9 have an outline with alternate horizontal and vertical sections.

The shaded zone in each diagram, that is the zone defined by the seals 7 and 9 is the one wherein one has the shutoff, i.e. the one in which the fluid or fluids cannot reach the flow space 11 of the distributor.

In the diagram $a$ of FIG. 5, one has the complete and simultaneous discharge of the two fluids A and B.

In the diagram $b$ (which corresponds to a rotation of the distributor 6 in the direction indicated by the arrow), one has the complete discharge of A while the fluid B is partially cut-off. By continuing to rotate the distributor 6, one has the complete cut-off of B, while A continues to flow in its entirety (diagram C).

In the diagram $d$ one has the partial flow of only A, and in the diagram $e$ one has the complete cut-off of both the fluids. In this connection, it is convenient to point out that, besides not to flow through the outlet 5, the two fluids are separated one from another since the seal 8 is interposed between the two supply openings.

By continuing the rotation of the distributor 6, one has the partial discharge only of the fluid B (diagram $f$), the complete discharge only of the fluid B, and finally the complete discharge of B and the partial one of A (diagram $h$).

It is to be pointed out that, for any setting illustrated in the above-said diagrams, for example $b$ or $f$, the operation of the cut-off does not change the selected admixing ratio.

The more representative settings (complete discharge of the two fluids, or only one of them, or the complete shut-off) are indicated on a dial 27 carried by the ring 26 in cooperation with a pointer 28 carried by the cut-off (see FIG. 4).

In FIGURES 6, 7 and 8 there are shown various examples of systems of seals, developed on a plane. In FIG. 6 there are shown two flat, annular seals 64 and 65, between which are interposed two double "fret" seals, 66 and 67, offset therebetween.

The interpretation of the diagrams of FIG. 6 is similar to that of the diagrams already described. In FIG. 7 the intermediate seals 66 and 67 have an obtuse angle outline, followed by a "fret."

The angles alpha and beta are so designed that, starting from the diagram $a$ of FIGURE 7, one has the gradual and progressive cut-off of the two passages A and B, to the position indicated by the diagram $d$, after that one has the progressive and gradual reduction of the zones which have been cut-off in the two passages (diagrams $e$ to $h$). By continuing the rotation of the distributing body, the two passages A and B are cut-off by the two frets of the seals 66 and 67, according to the positions illustrated in the diagrams $i$ to $p$ in FIG. 8. However, it is understood that the latter set of diagrams can be interpreted also in an autonomous way; namely, the distributor can be provided with seals carrying only the "fret"-shaped portion. As far as the control of the discharge flow from the value zero to the maximum value is concerned, the rotary distributor illustrated in the diagrams of FIGURES 6, 7 and 8 will be provided with an axially moving cut-off member, similar to that already described in connection with FIGURE 1.

The present invention has been described in some preferred embodiments thereof, being however understood that modifications and changes could be made therein without departing from the scope and the spirit of the invention as set forth in the herein appended claims.

We claim:

1. A valve unit for mixing and cutting off the inflow of two fluids comprising in combination a valve housing having a first and a second fluid bore for a first and a second fluid respectively, and a third opening for the outflow of said fluids, a distributing body having an arc shaped slit embracing said first and second fluid bores revolvably arranged within said housing having an axial bore and a radial bore communicating with said axial bore and with said arc shaped slit, a ring threaded on the upper end of said housing for holding said distributing body within said housing, an annular protuberance provided within said housing on which the lower end of said distributing body rests, a cylinder shaped shutting off element slidably arranged in said axial bore of said distributing body having an upper stem provided with a radial bore and an inner axial cavity at its lower end portion and an annular recess on its side surface for connecting said inner axial cavity with said radial bore of said distributing body, an inner protuberance on said housing, said inner axial cavity having its mouth shaped to match said inner protuberance of said housing, a lever pivotally mounted at one end at the upper portion of said distributing body with its free end passing through said radial bore of said stem for manual operation to axially slide said shutting off element within said distributing body and sealing means located between said housing, said distributing body and said shutting off element.

2. A valve unit according to claim 1, wherein said sealing means carried by the distributing body comprises a top seal having an annular outline, a bottom seal having an annular outline, and a pair of intermediate seals between the above-mentioned ones having an outline which develops partly along the periphery of said cylindrical distributing body, and partly along two generatrices of the distributor.

3. A valve unit according to claim 1 wherein said mouth on said inner axial cavity has the form of a conical seat designed to effect the control of the discharge flow and an annular seal is provided on said inner protuberance cooperating with said conical seat.

4. A valve unit as set forth in claim 1 wherein an extension is provided upon said distributing body on which said lever is pivotally mounted and a ring nut secures said distributing body to said housing, said extension projecting above said ring nut.

5. A valve unit according to claim 1 wherein the rotation of said distributing body and the sliding of said shutting off element is controlled by said lever, pivoted on an extension carried by the distributor, and projecting above a ring nut which fastens the fitting of the distributor in the housing thereof.

6. A valve unit according to claim 5 wherein a pointer is fixed to said lever and said ring nut carries a dial to indicate different selections, admixing and shut-off positions, as well as the range of intermediate positions cooperating with said pointer.

7. A valve unit according to claim 1 wherein said sealing means comprises a set of seals having a flat, annular outline, and a pair of intermediate seals having a "fret-like" outline and oriented according to a common axis of symmetry.

8. A valve unit according to claim 7, wherein the top section of said "fret-like" seals has a slightly curvilinear outline, with a center of curvature facing upward.

9. A valve unit according to claim 1 wherein said sealing means comprises a pair of annular seals on said distributing body arranged on parallel, horizontal planes, and a pair of intermediate dissymmetrical double-fret seals, interposed between said annular seals.

10. A valve unit according to claim 9 wherein said intermediate seals have an obtuse angle outline, with the apex facing inward, terminating with a straight fret.

11. A valve unit according to claim 9 wherein said intermediate seals are inserted within housings arranged on parallel planes, inclined to the axis of rotation of said distributing body.

12. A valve unit according to claim 9 wherein said intermediate seals are arranged on planes inclined to the axis of rotation of said distributing body, said planes being parallel therebetween.

References Cited

UNITED STATES PATENTS

| Re. 25,920 | 11/1965 | Moen | 137—636.4 X |
| 2,839,083 | 6/1958 | Moen | 137—636.2 |
| 2,924,243 | 2/1960 | Cordova | 137—636.2 X |
| 3,006,370 | 10/1961 | Parkhurst | 137—635.4 |
| 3,105,519 | 10/1963 | Fraser | 137—636 |

CLARENCE R. GORDON, *Primary Examiner.*